United States Patent [19]
Feiring

[11] Patent Number: 5,847,048
[45] Date of Patent: Dec. 8, 1998

[54] POLYMERS CONTAINING FLUOROALKOXY SIDE CHAINS

[75] Inventor: Andrew Edward Feiring, Wilmington, Del.

[73] Assignee: E. I. du Pont de Nemours and Company, Wilmington, Del.

[21] Appl. No.: 942,023

[22] Filed: Oct. 1, 1997

[51] Int. Cl.⁶ .................................................. C08F 8/00
[52] U.S. Cl. .......................................... 525/59; 526/247
[58] Field of Search .................................................. 525/59

[56] References Cited

U.S. PATENT DOCUMENTS

| | | | |
|---|---|---|---|
| 0,578,600 | 6/1897 | Coover, jr. | 525/59 |
| 2,975,164 | 3/1961 | Crawford et al. | 260/87.5 |
| 4,100,225 | 7/1978 | Mueller | 525/59 |
| 5,057,390 | 10/1991 | Sato et al. | 525/59 |
| 5,219,927 | 6/1993 | Moggi et al. | 525/59 |

FOREIGN PATENT DOCUMENTS

| | | | |
|---|---|---|---|
| 60-255811 | 12/1985 | Japan | 525/59 |
| 61/087766 | 5/1986 | Japan . | |
| 61-195101 | 8/1986 | Japan | 525/59 |

OTHER PUBLICATIONS

M. Hudlicky et al., Chemistry of Organic Fluorine Compounds, 2nd Ed., Ellis Horwood Ltd., Chichester, Sussex, England, 406–410, 1976.

L.G. Sprague et al., Chemistry of Organic Fluorine Compunds II, A Critical Review, American Chemical Society, Washington, 729–735, 1995.

L.S. Sletkina et al., *Vysokomol. Soedin. Ser. B.*, 9(5), 348–352, 1967.

*Primary Examiner*—Joseph L. Schofer
*Assistant Examiner*—N. Sarofim

[57] ABSTRACT

This invention concerns polymers, having fluoroalkoxy side chains, which are made by a novel process comprising reacting a polymer containing hydroxyl groups, especially poly(vinyl alcohol), with a fluorinated olefin in the presence of a base. The resulting polymers are useful in coatings, as in optical wave guides, and antireflective coatings and in other optical devices.

15 Claims, No Drawings

5,847,048

POLYMERS CONTAINING FLUOROALKOXY SIDE CHAINS

FIELD OF THE INVENTION

This invention concerns novel polymers containing fluoroalkoxy side chains which can be produced by a novel process comprising the reaction of polymers containing hydroxyl (alcohol) groups with highly fluorinated olefins in the presence of a catalytic amount of a strong base.

TECHNICAL BACKGROUND

Fluorinated polymers have many uses due to their unique properties vis-a-vie unfluorinated polymers. Fluorinated polymers often are more chemically and/or solvent resistant, weather better, have different surface properties, have lower refractive indices, etc. Commercially, most of these polymers are formed by directly polymerizing fluorine containing monomers, but this method has its drawbacks. Sometimes the monomers are quite expensive, and/or the polymerizations are difficult to carry out, and/or certain polymeric compositions are difficult to make because the appropriate mixture of monomers will not copolymerize. Therefore, new fluoropolymers, and methods for making them, are constantly being sought.

Polymers containing the grouping —OCF$_2$CFHR$^1$ wherein R$_1$ is fluorine or perfluoroalkyl are known, see for instance Japanese Patent Application 61/087766, U.S. Pat. No. 2,975,164, and European Patent Application 43,948. None of these polymers contains a hydroxyl group bound directly to a carbon atom of the polymer main chain.

The reaction of "monomeric" alcohols with fluorinated olefins in the presence of base to form an ether is known, see for instance M. Hudlicky, Chemistry of Organic Fluorine Compounds, 2$^{nd}$ Ed., Ellis Horwood Ltd., Chichester, Sussex, England, 1976, p. 406–410, and L. G. Sprague in M. Hudlicky et al., Ed., Chemistry of Organic Fluorine Compounds II, A Critical Review, American Chemical Society, Washington, 1995, p. 729–735. No mention is made of using hydroxyl containing polymers as one of the reactants.

SUMMARY OF THE INVENTION

This invention concerns a polymer, comprising, repeat units of the formulas

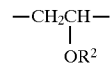     (I)

and

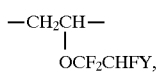     (II)

wherein:
  Y is fluorine, hydrogen, chlorine, perfluoroalkyl, perfluoroalkoxy, or perfluoroalkyl or perfluoroalkoxy containing one or more ether oxygen atoms between alkyl carbon atoms;
  each R$^2$ is independently hydrogen or —C(O)R$^3$;
  R$^3$ is hydrocarbyl or substituted hydrocarbyl; and
  provided that:
    a molar ratio of (I):(II) is about 100:1 to about 1:10; and when all of R$^2$ is —C(O)R$^3$, only (I) and (II) are present in said polymer.

This invention also concerns a process for the production of fluorinated polymers, comprising, contacting, a polymer containing a hydroxyl group bonded to a saturated carbon atom, a catalytically effective amount of a base, and a compound of the formula F$_2$C=CFY, wherein:
  Y is fluorine, hydrogen, chlorine, perfluoroalkyl, perfluoroalkoxy, or perfluoroalkyl or perfluoroalkoxy containing one or more ether oxygen atoms between alkyl carbon atoms; and
  a conjugate acid of said base has a pKa of about 14 or more.

DETAILS OF THE INVENTION

The fluoroalkyl grafted polymers described herein are made by contacting a hydroxy containing polymer with a fluorinated olefin in the presence of a catalytic amount of base. Suitable fluorinated olefins have the formula F$_2$C=CFY, wherein Y is fluorine, hydrogen, chlorine, perfluoroalkyl, perfluoroalkoxy, or perfluoroalkyl or perfluoroalkoxy containing one or more ether oxygen atoms between alkyl carbon atoms. By containing one or more ether oxygen atoms between alkyl segments is meant a group such as —CF$_2$CF$_2$OCF$_3$. In preferred fluorinated olefins Y is fluorine, perfluoro-n-alkyl or perfluoro-n-alkoxy (including trifluoromethyl), more preferably fluorine or perfluoro-n-alkoxy, and especially preferably fluorine [meaning the fluoroolefin is tetrafluoroethylene (TFE)]. Other specific preferred fluorinated olefins are trifluoroethylene, chlorotrifluoroethylene, hexafluoropropylene, perfluoro(methyl vinyl ether), perfluoro(ethyl vinyl ether) and perfluoro(propyl vinyl ether), and they produce polymers having the corresponding Y groups hydrogen, chlorine, trifluoromethyl, trifluoromethoxy, pentafluoroethoxy and heptafluoropropoxy, respectively.

The base used in the process has a conjugate acid whose pKa is about 14 or more, preferably about 16 or more. The pKa of these conjugate acids may be measured by methods known in the art, see for instance F. G. Bordwell, Acc. Chem. Res., vol. 21, p. 456–463 (1988). Useful bases include the alkali metal hydroxides, alkali metal hydrides, and alkali metal alkoxides. A particularly preferred base is potassium t-butoxide. The base is preferably relatively non-nucleophilic.

By a catalytically effective amount of base is meant a sufficient amount of base to (presumably) form enough alkoxide anions on the polymer to permit the reaction to proceed at a reasonable rate, but not so much that a significant proportion of the polymeric hydroxyl groups will be tied up as alkoxide anions and as a result not react or give side reactions. Although not critical for the process, it has been found that about 1–10 mole percent of the base, based on the limiting reactant (hydroxyl groups on the polymer or fluorinated olefin) in the process, is a useful range.

The temperature at which the process is carried out is not critical, the main factors to be considered are reaction rate and minimization of side reactions. A useful temperature range is about —20° C. to about 100° C., preferably about 0° C. to about 60° C., more preferably about ambient temperature (about 20° C. to about 30° C., but the reaction is exothermic, and some heating may occur).

The reaction may be carried out with the neat ingredients, especially if the fluorinated olefin is a liquid. However it is preferred to carry out the process in a liquid which is a solvent for the hydroxyl containing polymer. The solvent should preferably not contain hydroxyl or other relatively acidic groups that may react with the base that is present. Polar solvents such as dimethylsulfoxide and N,N-dimethylformamide are useful.

It is preferred to conduct the grafting process under an inert gas blanket, such as nitrogen. The process may be exposed to the air, but absorption of water vapor may lead to a loss of the activity of the catalytic base.

The hydroxyl containing polymer may be any polymer which contains hydroxyl groups which are bound to saturated carbon atoms. By a saturated carbon atom is meant a carbon atom that is bound to four other atoms. Thus the hydroxyl group is essentially synonymous with an alcohol hydroxyl. The hydroxyl containing polymer should not contain groups (other than the hydroxyl) groups that substantially react with the base that is present. Thus relatively strongly acidic groups on the polymer should be avoided. These in some instances may be neutralized so that the reaction is allowed to proceed. For instance carboxyl groups present on the polymer can be converted to their alkali metal salts, and later converted back to carboxyl groups by acidification. It is also preferred that the hydroxyl containing polymer not contain substantial amounts of esters, since these may hydrolyze to give acids which will neutralize the basic catalyst. If esters are present care should preferably be taken to run the process under anhydrous conditions. Useful polymers include poly(vinyl alcohol) (PVA) or copolymers of vinyl alcohol, and polymers containing a repeat unit which contains a hydroxyl group such as polymeric carbohydrates.

Surprisingly, as adding the grafted side chains generally increases the steric hindrance about the remaining hydroxyl groups, a relatively high proportion of the hydroxyl groups in the polymer may be grafted with the fluorinated olefin. For instance at least about 77 mole percent of the hydroxyl groups in PVA may be grafted with fluorinated olefin (see Examples 1 and 4). Also, the fluorinated olefin appears to be completely grafted when it is the stoichiometrically controlling reactant, with little side reaction, since soluble grafted polymers are obtained (see Examples 2 and 3).

A preferred hydroxyl containing polymer is PVA. PVA is usually made by polymerizing vinyl acetate and then partially or essentially completely hydrolyzing the acetate ester groups to hydroxyl groups. By PVA is meant a polymer in which at least 50 mole percent of the acetate ester groups are hydrolyzed, preferably at least 90% are hydrolyzed, and more preferably essentially "all" of the acetate groups are hydrolyzed.

When "completely" hydrolyzed PVA is grafted with the fluorinated olefin, a polymer containing repeat units (I) and (II), in which $R^2$ is H, is obtained. In one preferred form of the grafted polymer, all of $R^2$ are hydrogen. In another preferred form, at least 1 mole percent, more preferably at least 3 mole percent, and especially preferably at least 5 mole percent of $R^2$ are hydrogen. Useful and preferred fluorinated olefins for the grafting of PVA are the same as listed above for the grafting process. Polymers in which some or all of the $R^1$ groups are —C(O)$R^3$ can be made by starting with only partially hydrolyzed PVA (and in which $R^3$ will be methyl), and/or by reaction of the grafted polymer with a carboxylic acid anhydride.

$R^3$ is hydrocarbyl or substituted hydrocarbyl. By hydrocarbyl is meant a univalent group containing only carbon and hydrogen, while substituted hydrocarbyl is a univalent group containing carbon and hydrogen, and substituted with one or more groups or substituents. Useful groups include halo, oxo, ether, thioether, and tertiary amino. It is preferred that $R^3$ is alkyl, especially methyl.

Polymers containing repeat units (I) and (II) may also contain other repeat units. These polymers may generally be made by copolymerizing vinyl acetate (or another vinyl ester) with the monomer that yields the other desired repeat unit(s), hydrolyzing the ester groups, and then grafting on the fluorinated olefin (see Example 6). Useful comonomers include TFE, ethylene, vinyl chloride, acrylic acid and methacrylic acid. In the latter two instances it would be necessary to use enough base to neutralize the carboxylic acid groups. The synthesis of such vinyl acetate copolymers is known, see for instance B. Elvers et al., Ed., Ullmann's Encyclopedia of Industrial Chemistry, Vol. A 22, $5^{th}$ Ed., VCH Verlagsgesellschaft mbH, Weinheim, 1993, p. 7–8.

It is preferred that the molar ratio of (I):(II) in the copolymer is about 90:10 to about 10:90.

The grafted polymers, especially grafted PVA polymers, are easily prepared in a single step from commercially available starting materials. Sometimes the polymers may develop some color during the grafting reaction; this color may be removed by treatment with a bleaching agent such as hydrogen peroxide. Specific properties and applications will depend somewhat on the structure and amount of the fluoroalkyl ether side chains. Thus, PVA polymers containing 40 to 80% tetrafluoroethoxy side chains are amorphous plastics and soluble in inexpensive organic solvents, such as acetone or THF, allowing ready formation of clear films or coatings with low refractive indices. The refractive index is readily controlled by the amount of fluoroalkyl ether substitution as illustrated by Examples 1 to 3. Polymers with a low refractive index can be used for the production of optical wave guides, lenses, antireflective coatings, holographic films and other optical devices. The design of low refractive index polymers is discussed by Groh and Zimmermann in Macromolecules, Vol. 24, p. 6660–6663 (1991). A PVA polymer containing about 77% —OCF$_2$CHFOC$_3$F$_7$ side chains is elastomeric and soluble in fluorinated solvents, such as 1,1,2-trichlorotrifluoroethane. This composition is useful for imparting soil and stain resistance to fibers or as an antisoiling coating for solid objects. If the resulting polymer is a thermoplastic, it may be used as a molding resin. One skilled in the art may readily select the level and type of fluoroalkyl grafts to impart the desired properties.

In the Examples, all pressures are gauge pressures. Inherent viscosities were measured at a concentration of 2 g/L. The following abbreviations are used:

DSC—Differential Scanning Calorimetry (measured at a heating rate of 20° C./min)

DMSO—dimethylsulfoxide

Mw—weight average molecular weight

TFE—tetrafluoroethylene

Tg—glass transition temperature

THF—tetrahydrofuran

EXAMPLE 1

Synthesis of Poly(vinyl alcohol-co-vinyl 1,1,2,2-tetrafluoroethyl ether)

A 1 gallon metal autoclave was purged with nitrogen and charged with 5.6 g (0.05 mol) of potassium t-butoxide, 200 mL of DMSO and a solution prepared by dissolving 44 g (1.75 mol OH) of poly(vinyl alcohol) (Aldrich Chemical Co., Milwaukee, Wis. U.S.A., Mw 125,000, 100% hydrolyzed) in 2 L of DMSO. The vessel was closed, pressure tested with nitrogen and evacuated. The vessel contents were stirred at about 25° C. and TFE was added to 1.4 MPa pressure. As the pressure fell, additional TFE was added maintaining the pressure at about 1.0 MPa and the temperature at about 25° C. until 220 g (2.2 mol) of TFE had been added. The mixture was stirred for a total of about 23 h. The reactor was vented and the contents were mixed with 150 ml of glacial acetic acid. The viscous DMSO solution was added to excess water with stirring. The precipitated solid was cut into small pieces and chopped in a blender with water until a fine granular solid was obtained. The solid was filtered and air dried for 16 h giving 207.6 g of product. The tan solid was dissolved in 3.5 L of acetone and heated to reflux. Hydrogen peroxide (50 mL, 30%) was added and the solution was refluxed for 8 h. An additional 50 mL of hydrogen peroxide was added and refluxing was continued for 3 days giving a colorless solution. The acetone solution was cooled, filtered, concentrated to about 1.5 L and poured slowly into 8 L of water. The precipitate was chopped several times in a blender to give a white granular solid which was dried under vacuum for 2 days at room temperature giving 209 g of polymer. $^{19}$F NMR (acetone–d6) –87.3 (2F); –137.1 (2F). $^1$H NMR showed peaks at δ8 6.1 (assigned to CF$_2$H), 4.8 (assigned to H—C—OCF$_2$) and 3.9 (assigned to H—C—OH) in a ratio of 3.4:3.4: 1. Tg (DSC) 23.8° C. Refractive index 1.3852. Inherent viscosity (acetone) 1.13 dL/g. Anal. Found: C, 35.08; H, 3.40; F, 42.37. From the % C analysis, it was calculated that 77% of the OH groups were converted to —OCF$_2$CF$_2$H.

EXAMPLE 2

Synthesis of Poly (vinyl alcohol-co-vinyl 1,1,2,2-tetrafluoroethyl ether)

The procedure of Example 1 was followed except that the total amount of TFE fed was 123 g (1.23 mol) giving 185.0 g of white polymer powder. $^1$H NMR showed peaks at δ6.1 (assigned to CF$_2$H), 4.8 (assigned to H—C—OCF$_2$) and 3.9 (assigned to H—C—OH) in a ratio of 1.5:1.5:1. Tg (DSC) 33.7° C. Refractive index 1.3960. Inherent viscosity (acetone) 0.81 dL/g. Anal. Found: C, 36.25; H, 3.59; F, 43.00. From the % C analysis, it was calculated that 66% of the OH groups were converted to OCF$_2$CF$_2$H.

EXAMPLE 3

Synthesis of Poly (vinyl alcohol-co-vinyl 1,1,2,2-tetrafluoroethyl ether)

The procedure of Example 1 was followed except that the total amount of TFE fed was 70 g (0.7 mol) giving 149.8 g of white polymer. $^1$H NMR showed peaks at δ6.1 (assigned to CF$_2$H), 4.8 (assigned to H—C—OCF$_2$) and 3.9 (assigned to H—C—OH) in a ratio of 0.5:0.5: 1. Tg (DSC) 65.2° C. Refractive index 1.4188. Inherent viscosity (acetone) 0.80 dL/g. Anal. Found: C, 38.98; H, 4.49; F, 35.56. From the % C analysis, it was calculated that 46% of the OH groups were converted to OCF$_2$CF$_2$H.

EXAMPLE 4

Synthesis of Poly(vinyl alcohol-co-vinyl 1,1,2-trifluoro-2-heptafluoropropoxyethyl ether)

Poly(vinyl alcohol) (DuPont Elvanol® 90-50, M$_w$ 56000, M$_n$ 30000) (15.4 g, 0.35 mol OH groups) was dissolved in 650 mL of DMSO in a 1-L glass round bottom flask under nitrogen. A solution of 1.0M potassium t-butoxide in THF (35 mL, 0.035 mol) was added and the mixture was stirred for 0.5 h. Perfluoro(propyl vinyl ether) (122 g, 0.47 mol) was added in one portion, resulting in an exothermic reaction and formation of a precipitate. This mixture was stirrer for 4 h at room temperature and then quenched by the addition of 100 mL of glacial acetic acid. Water was added and the liquid phase was decanted from the solid. The solid was treated with 2 L of 1,1,2-trichlorotrifluoroethane and filtered. The filtrate was concentrated to about 700 mL and poured slowly into 4 L of pentane. The precipitated polymer was isolated and dried under vacuum at room temperature affording 39 g of light tan solid. The solid was suspended in 900 mL of acetone and heated to reflux. Hydrogen peroxide (30 mL, 30%) was added and the mixture refluxed overnight. Another 10 mL of hydrogen peroxide was added and reflux was continued overnight. The mixture was cooled and the now white polymer was isolated, washed with water and dried under vacuum at room temperature giving 35.7 g of white rubbery polymer. Unlike the TFE grafted polymers, this material was found to be insoluble in acetone, THF and DMSO, but soluble in 1,1,2-trichlorotrifluoroethane. $^{19}$F NMR (1,1,2-trichlorotrifluoroethane) –82.6 (3F), –85,8 (2F), –88.0 and –88.5 (2F), –131.1 (2F) and –144.8 (1F). $^1$H NMR (1,1,2-trichlorotrifluoroethane) showed peaks at δ 5.8 (assigned to CFH), 4.6 (assigned to H—C—OCF$_2$) in a 1:1 ratio plus a weak peak at 3.9 (assigned to H—C—OH). Tg (DSC) –15.6° C. Anal. Found: C, 27.84; H, 1.47; F, 53.63. From the % C analysis, it was calculated that 77% of the OH groups were converted to —OCF$_2$CHFOC$_3$F$_7$.

EXAMPLE 5

Synthesis of Poly(vinyl acetate-co-vinyl 1,1,2.2-tetrafluoroethyl ether)

A 5.0 g portion of the polymer from Example 2 was dissolved in 80 mL of acetic anhydride. Triethylamine (5 mL) was added and the solution was heated in a 60° C. oil bath for 22 h. The solution was cooled to room temperature and poured slowly into 1 L of water. The solution was decanted from a gummy precipitate. The precipitate was dissolved in acetone and the solution was evaporated under reduced pressure. The solid was suspended in 450 mL of acetone and 5 mL of 30% hydrogen peroxide was added. This solution was refluxed overnight. It was cooled to room temperature and diluted with water. The liquid phase was decanted, the solid polymer was washed with water and dried at 0.1 mm and 50° C., giving 4.97 g of white solid. $^1$H NMR showed peaks at δ6.1 (assigned to CF$_2$H), 5.0 (assigned to H—C—OAc) and 4.7 (assigned to H—C—OCF$_2$) in a ratio of 1:0.43:1. Tg (DSC) 18.7° C. Refractive index 1.3960. Inherent viscosity (acetone) 0.65 dL/g. Anal. Found: C, 38.98; H, 4.49; F, 35.56. From the % C analysis, it was calculated that the polymer contained 34% OAc and 66% —OCF$_2$CF$_2$H groups.

EXAMPLE 6

Synthesis of Poly(vinyl alcohol-co-vinyl 1,1.2,2-tetrafluoroethyl ether-co-tetrafluoroethylene)

A copolymer of TFE and vinyl alcohol (5.35 g), prepared by hydrolysis of a TFE vinyl acetate copolymer and containing about 62 weight % vinyl alcohol groups, was dissolved in 220 mL of DMSO in a 400 mL pressure vessel. While bubbling argon through this solution, a solution of potassium t-butoxide in THF (1.0M, 4.5 mL) was added. The vessel was closed, evacuated and charged with 10 g of TFE. The vessel was agitated for 18 h at room temperature. It was vented and 25 ml of glacial acetic acid was added. The solution was diluted with 100 mL of DMSO, filtered and poured into 4 L of water. The precipitate was collected, washed in a blender with several portions of water and dried under vacuum at 40–50° C. giving 7.14 g of polymer. A $^{19}$F NMR spectrum in DMSO–$d_6$ showed peaks of equal area at −86.8 and −137.1 ppm for the OCF$_2$ and CF$_2$H fluorines in the 1,1,2,2-tetrafluoroethyl groups in addition to absorptions at −110 to −130 for the backbone fluorines. From integration of these peaks, it was calculated that the product polymer had —CF$_2$CF$_2$— and —CH$_2$CH(OCF$_2$CF$_2$H)— repeating units in a molar ratio of 1:1.26. Anal. Found: C, 38.54, H, 3.67; F, 41.19.

EXAMPLE 7

Synthesis of a Lower Molecular Weight Poly(vinyl alcohol-co-vinyl 1,1,2-trifluoro-2-heptafluoropropoxyethyl ether)

Poly(vinyl alcohol) (Aldrich, Mw 13,000–23,000) (8.8 g) was dissolved in 250 mL DMSO by heating under nitrogen to 95° C. in a 500 mL round bottom flask. The solution was cooled to 20° C. and a solution of 1.0M potassium t-butoxide in THF (20 mL) was added and stirred for 10 min. Then, perfluoro(propyl vinyl ether) (69 g, 0.26 mol) was added rapidly. An exothermic reaction ensued. The resulting mixture was stirred overnight. Glacial acetic acid (20 mL) was added and the solution was decanted from the solid polymer. The solid polymer was washed several times with water and acetone and dried under pump vacuum to give 49.9 g of product. The solid was dissolved in 1,1,2-trichlorotrifluoroethane and precipitated into hexane. The liquid was decanted from the solid residue which was dried under vacuum to give 39.8 g of product. $^{19}$F NMR (1,1,2-trichlorotrifluoroethane) −82.6 (3F), −85.8 (2F), −88.0 and −88.5 (2F), −131.1 (2F) and −144.8 (1F). $^1$H NMR (1,1,2-trichlorotrifluoro-ethane ) showed peaks at δ5.8 (assigned to CF<u>H</u>), 4.6 (assigned to <u>H</u>—C—OCF$_2$) in a 1:1 ratio plus a weak peak at 3.9 (assigned to <u>H</u>—C—OH). Tg (DSC) −10.8° C.

What is claimed is:

1. A polymer, comprising, repeat units of the formulas

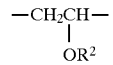     (I)

and

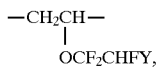     (II)

wherein:

Y is fluorine, hydrogen, chlorine, perfluoroalkyl, perfluoroalkoxy, or perfluoroalkyl or perfluoroalkoxy containing one or more ether oxygen atoms between alkyl carbon atoms;

each R$^2$ is independently hydrogen or —C(O)R$^3$;

R$^3$ is hydrocarbyl or substituted hydrocarbyl; and provided that:

a molar ratio of (I):(II) is about 100:1 to about 1:10; and when all of R$^2$ is —C(O)R$^3$, only (I) and (II) are present in said polymer.

2. The polymer as recited in claim 1 wherein all of R$^2$ are hydrogen.

3. The polymer as recited in claim 1 wherein Y is fluorine, perfluoro-n-alkyl, or perfluoro-n-alkoxy.

4. The polymer as recited in claim 1 wherein Y is fluorine.

5. The polymer as recited in claim 1 wherein one or more other repeat units are present.

6. The polymer as recited in claim 5 wherein said other repeat unit is —CF$_2$CF$_2$—.

7. The polymer as recited in claim 1 wherein said ratio of (I):(II) is about 90:10 to about 10:90.

8. A process for the production of fluorinated polymers, according to claim 1, comprising, contacting, a first polymer containing a hydroxyl group bonded to a saturated carbon atom, a catalytically effective amount of a base, and a compound of the formula F$_2$C=CFY, wherein:

Y is fluorine, hydrogen, chlorine, perfluoroalkyl, perfluoroalkoxy, or perfluoroalkyl or perfluoroalkoxy containing one or more other oxygen atoms between alkyl carbon atoms; and a conjugate acid of said base has a pKa of about 14 or more; and provided that said first polymer contains repeat units of formula I

     (I)

and wherein each R$^2$ is independently hydrogen or —C(O)R$^3$;

R$^3$ is hydrocarbyl or substituted hydrocarbyl; and wherein at least some of R$^2$ is hydrogen.

9. The process as recited in claim 8 carried out at a temperature of about 0° C. to about 60° C.

10. The process as recited in claim 8 wherein said polymer containing hydroxyl groups is dissolved in a solvent.

11. The process as recited in claim 8 wherein said compound of the formula F$_2$C=CFY is tetrafluroethylene, trifluoroethylene, chlorotrifluoroethylene, hexafluoropropylene, perfluoro (methyl vinyl ether), perfluoro(ethyl vinyl ether) or perfluoro (propyl vinyl ether).

12. The process as recited in claim 8 wherein said compound of the formula F$_2$C=CFY is tetrafluoroethylene.

13. The process as recited in claim 8 wherein said pKa is about 16 or more.

14. The process as recited in claim 8 wherein said base is selected from the group consisting of alkali metal hydroxides, alkali metal alkoxides and alkali metal hydrides.

15. The process as recited in claim 8 wherein said base is potassium t-butoxide.

* * * * *